(12) United States Patent
Wang et al.

(10) Patent No.: US 12,431,501 B2
(45) Date of Patent: Sep. 30, 2025

(54) BATTERY CELL, BATTERY AND ELECTRIC DEVICE

(71) Applicant: CONTEMPORARY AMPEREX TECHNOLOGY CO., LIMITED, Ningde (CN)

(72) Inventors: Jiazheng Wang, Ningde (CN); Qingwei Yan, Ningde (CN); Xiaobin Dong, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 34 days.

(21) Appl. No.: 18/424,880

(22) Filed: Jan. 29, 2024

(65) Prior Publication Data

US 2024/0413332 A1 Dec. 12, 2024

Related U.S. Application Data

(63) Continuation of application No. PCT/CN2022/098015, filed on Jun. 10, 2022.

(51) Int. Cl.
*H01M 10/0525* (2010.01)
*B60L 50/64* (2019.01)
(Continued)

(52) U.S. Cl.
CPC ............. *H01M 4/62* (2013.01); *B60L 50/64* (2019.02); *H01M 4/133* (2013.01); *H01M 4/366* (2013.01);
(Continued)

(58) Field of Classification Search
None
See application file for complete search history.

(56) References Cited

U.S. PATENT DOCUMENTS

| 2006/0110660 A1 | 5/2006 | Satou et al. |
| 2020/0091519 A1* | 3/2020 | Zhou ................ H01M 10/0525 |

(Continued)

FOREIGN PATENT DOCUMENTS

| CN | 111312987 A | 6/2020 |
| CN | 111446489 A | 7/2020 |

(Continued)

OTHER PUBLICATIONS

The Decision to Grant a Patent received in the counterpart Japanese application 2023-547262, mailed on Feb. 18, 2025.

(Continued)

*Primary Examiner* — Yoshitoshi Takeuchi
(74) *Attorney, Agent, or Firm* — K&L Gates LLP

(57) ABSTRACT

Provided are a battery cell, a battery and an electric device. The battery cell includes a positive electrode plate and a negative electrode plate, the negative electrode plate includes a negative electrode current collector, a negative electrode active material layer arranged on at least one surface of the negative electrode current collector, and a lithium supplement layer, wherein the negative electrode active material layer includes a first portion and a second portion connected with the first portion, the first portion exceeds the positive electrode plate, the second portion is arranged corresponding to the positive electrode plate, and the lithium supplement layer is arranged on at least part of a surface of the first portion away from the negative electrode current collector. The negative electrode plate of the present application can improve the first Coulomb efficiency, cycle performance and storage performance of the battery cell.

7 Claims, 4 Drawing Sheets

(51) Int. Cl.
  *H01M 4/133* (2010.01)
  *H01M 4/36* (2006.01)
  *H01M 4/587* (2010.01)
  *H01M 4/62* (2006.01)
  *H01M 4/02* (2006.01)

(52) U.S. Cl.
  CPC ...... *H01M 4/587* (2013.01); *H01M 2004/027* (2013.01); *H01M 2220/20* (2013.01)

(56) References Cited

U.S. PATENT DOCUMENTS

| | | | |
|---|---|---|---|
| 2020/0091558 A1* | 3/2020 | Zhou | H01M 10/0525 |
| 2021/0210750 A1* | 7/2021 | Chen | H01M 4/24 |
| 2021/0305633 A1* | 9/2021 | Xia | H01M 4/587 |
| 2022/0069284 A1* | 3/2022 | Yang | H01M 4/134 |
| 2022/0311104 A1* | 9/2022 | Tang | H01M 4/131 |
| 2023/0112421 A1* | 4/2023 | Zhang | H01M 50/46 |
| | | | 429/209 |

FOREIGN PATENT DOCUMENTS

| | | | |
|---|---|---|---|
| CN | 112018329 A | 12/2020 | |
| EP | 3886210 A1 | 9/2021 | |
| JP | H07192766 A | 7/1995 | |
| JP | 2000082498 A | 3/2000 | |
| KR | 20070078805 A | 8/2007 | |
| WO | WO-2020118884 A1 * | 6/2020 | ........ H01M 10/0431 |

OTHER PUBLICATIONS

The extended European search report received in the counterpart European application 22920996.0, mailed on Feb. 7, 2025.
International Search Report received in the corresponding international application PCT/CN2022/098015, mailed Jan. 3, 2023.

* cited by examiner

BATTERY CELL, BATTERY AND ELECTRIC DEVICE

CROSS REFERENCE TO RELATED MATTER

This application is a continuation of international application PCT/CN2022/098015, filed Jun. 10, 2022, which claims the priority of Chinese Patent Application No. 202210366285.5 filed on Apr. 8, 2022, entitled "BATTERY CELL, BATTERY AND ELECTRIC DEVICE", the entire content of which is hereby incorporated by reference in its entirety.

TECHNICAL FIELD

The present application relates to the field of battery technology, and in particular, to a battery cell, a battery and an electric device.

BACKGROUND

A lithium ion battery cell is widely used in electronic devices, such as mobile phones, notebook computers, battery cars, electric cars, electric aircraft, electric ships, electric toy cars, electric toy ships, electric toy planes and power tools, and so on.

In the development of battery cell technology, the improvement of battery cell performance is an urgent problem to be solved.

SUMMARY

Embodiments of the present application provide a battery cell, a battery and an electric device, which aims to improve the first Coulomb efficiency, cycle performance and storage performance of the battery cell.

In a first aspect, the present application provides a battery cell. The battery cell includes a positive electrode plate and a negative electrode plate, the negative electrode includes a negative electrode current collector, a negative electrode active material layer arranged on at least one surface of the negative electrode current collector, and a lithium supplement layer, wherein the negative electrode active material layer includes a first portion and a second portion connected with the first portion, the first portion exceeds the positive electrode plate, the second portion is arranged corresponding to the positive electrode plate, and the lithium supplement layer is arranged on at least part of a surface of the first portion away from the negative electrode current collector.

In the above technical solution, the lithium supplement layer is arranged on the first portion, and the standard electrode potential of lithium relative to hydrogen in the lithium supplement layer is less than the standard electrode potential of the first portion relative to hydrogen, and there is a voltage difference between the lithium supplement layer and the first portion. After the battery cell is injected with the electrolyte, an electrical circuit is formed between the lithium supplement layer and the first portion due to the contact between the lithium supplement layer and the first portion, which is equivalent to a short circuit state, the lithium in the lithium supplement layer will lose electrons and become free-moving lithium ions which will be embedded into the first portion, and then the lithium will be diffused and embedded to the second portion at a slow speed. Further, since the potential of the lithium supplement layer decreases, the lithium ions of the second portion can be prevented from being diffused and embedded into the first portion, thereby improving the first Coulomb efficiency, cycle performance and storage performance of the battery cell.

In some implementations, a theoretical capacity of the lithium supplement layer is $C_{Li}$, a theoretical capacity of a part of the first portion arranged corresponding to the lithium supplement layer is $C_1$, and $C_{Li}$ and $C_1$ satisfy the following relationship: 20% $C_1 \leq C_{Li} \leq 120\%$ $C_1$, optionally, 90% $C_1 \leq C_{Li} \leq 120\%$ $C_1$.

In the above technical solution, the potential of the lithium supplement layer is lower than the lithium intercalation platform voltage of the first portion. In this case, the lithium in the lithium supplement layer can be stably embedded into the first portion, and the migration capacity of the lithium in the lithium supplement layer migrating to the first portion matches the capacity Attenuation of lithium in the negative electrode active material layer, which reduces the risk of lithium deposition and lithium precipitation on the negative electrode active material layer, thus improving the effect of lithium supplement and ensure the safety performance of the battery.

In some implementations, the negative electrode current collector includes a first surface and a second surface opposite to each other, and the negative electrode plate includes two negative electrode active material layers respectively arranged on the first surface and the second surface, wherein at least part of the first portion of at least one of the two negative active material layers is provided with the lithium supplement layer. In some implementations, there are relatively many arrangement sites for the lithium supplement layer, and the lithium supplement layer can be flexibly set up according to the process requirements.

In some implementations, for each of the two negative electrode active material layers, at least part of the first portion of the negative electrode active material layer is provided with the lithium supplement layer. In embodiments of the present application, the lithium supplement to the two negative active material layers can further improve the lithium supplement effect.

In some implementations, in a direction from the first portion to the second portion, the first portion includes a first sub-portion and a second sub-portion opposite to each other, and the second portion connects the first sub-portion and the second sub-portion; and the first sub-portion of one of the two negative electrode active material layers is provided with the lithium supplement layer, and the second sub-portion of the other of the two negative electrode active material layers is provided with the lithium supplement layer. In embodiments of the present application, the lithium can be supplemented pertinently by supplementing the lithium at different positions of the two negative active material layers in consideration of the structure of the electrode component, especially a winding electrode component.

In some implementations, the theoretical capacity of the lithium supplement layer provided corresponding to the first sub-portion is $C_A$; the theoretical capacity of the lithium supplement layer provided corresponding to the second sub-portion is $C_B$; wherein $C_A > C_B$.

In the above technical solution, there is an electrolyte inside the wound electrode component, and the position of the first sub-portion is more favorable for the diffusion of lithium ions than that of the second sub-portion. Therefore, $C_A > C_B$ can guarantee the migration capacity of the first sub-portion with respect to the lithium of the negative electrode active material layer.

In some implementations, the lithium supplement layer includes a metal lithium layer or a lithium alloy layer; optionally, the metal lithium layer includes a lithium foil layer or a lithium powder layer, and further optionally, the metal lithium layer is a lithium foil layer; optionally, the lithium alloy layer includes an aluminum-lithium alloy layer, a magnesium-lithium alloy layer or a tin-lithium alloy layer.

In the above technical solution, the metal lithium of the metal lithium layer has relatively high gram capacity and purity, so it is not easy to produce by-products, thus reducing the adverse effect on the battery cell.

The lithium alloy layer can not only supplement the lithium source to the negative electrode active material layer, but also enhance the strength of the negative electrode plate through other metals in the lithium alloy layer.

In some implementation, the negative electrode active material layer includes a negative electrode active material, which includes one or more of artificial graphite, natural graphite and silicon-based materials.

In the above technical solution, after the lithium in the lithium supplement layer loses electrons and forms lithium ions, the lithium ions embed into the first portion and form $LiC_x$ ($x \geq 6$) and/or $Li_xSi_y$ ($x>0$, $y>0$) with the negative electrode active material. In this case, the lithium supplement layer, $LiC_x$ and/or $Li_xSi_y$ are combined to form a stable lithium supplement source, and then lithium will be diffused and embedded into the second portion at a slow speed. Due to the decrease of the potential of the lithium supplement layer, the lithium ions of the second portion can be effectively prevented from being diffused and embedded into the lithium ion of the first portion, thus the performance of the battery cell can be improved.

In some implementations, the battery cell further include an isolation element arranged between the positive electrode plate and the negative electrode plate, and the positive electrode plate, the isolation element and the negative electrode plate are wound to form a winding structure, optionally, the negative electrode plate includes two negative electrode active material layers, each of which includes a first sub-portion and a second sub-portion opposite to each other along a winding direction, the first sub-portion is arranged close to a winding axis, the second sub-portion is arranged away from the winding axis, the first sub-portion of one of the two negative electrode active material layers is provided with the lithium supplement layer, and the second sub-portion of the other of the two negative electrode active material layers is provided with the lithium supplement layer, wherein the theoretical capacity of the lithium supplement layer arranged corresponding to the first sub-portion is $C_A$, and the theoretical capacity of the lithium supplement layer arranged corresponding to the second sub-portion is $C_B$, wherein $C_A > C_B$.

In a second aspect, the present application provides a battery comprising the battery cell of any implementation of the first aspect of the present application.

In a third aspect, the present application provides an electric device comprising the battery of the second aspect of the present application for providing electrical energy.

BRIEF DESCRIPTION OF THE DRAWINGS

Characteristics, advantages and technical effects of the exemplary embodiments of the present application will be described with reference to the accompanying drawings.

Figure 1:
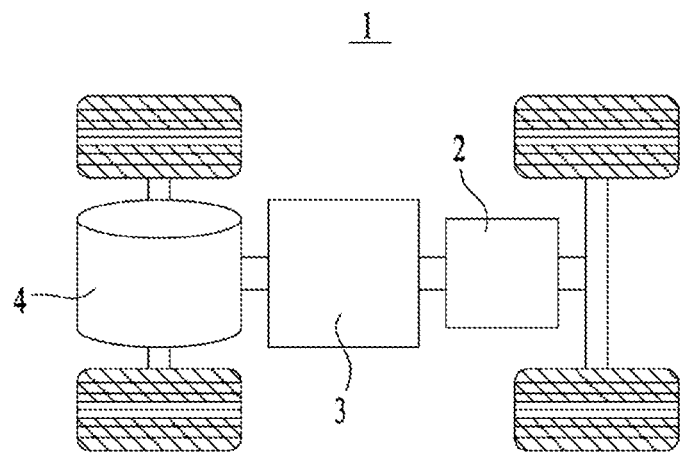
FIG. 1 is a structural schematic diagram of a vehicle provided by some embodiments of the present application.

The accompanying drawings may not be drawn according to the actual scale.

Reference numbers shown in the accompanying drawings are:

X, a first direction; Y, a winding direction;
1, a vehicle;
2, a battery;
3, a controller;
4, a motor;
5, a box; 51, a first box part; 52, a second box part; 53, a holding space.
6, a battery module;
7, a battery cell;
10, an electrode component; 11, a main body portion; 12, an electrode tab portion; 13, a current collecting member; 14, a positive electrode plate; 15, an isolation element;
8, a negative electrode plate; 81, a negative electrode current collector; 811, a first surface; 812, a second surface; 82, a negative electrode active material layer; 8211, a first sub-portion; 8212, a second sub-portion; 822, a second portion; 83, a lithium supplement layer.
20, a housing component; 21, a housing; 22, a cover component; 23, an end cover; 221, an electrode terminal.

DETAILED DESCRIPTION

To make the purpose, technical solution and advantages of the embodiments of the present application clearer, the technical solution in the embodiments of this application will be clearly described in combination with the drawings in the embodiments of this application. It's clear that the embodiments described are some of the embodiments of this application, but not all of them. Based on the embodiments in this application, all other embodiments obtained by ordinary technicians in the field without creative work fall within the scope of this application.

Unless otherwise defined, all technical and scientific terms used in this application have the same meaning as those belonging to the technical field of this application; the terms used in the specification of this application are only for the purpose of describing specific embodiments and are not intended to limit this application. The terms "including" and "having" in this specification and claims of the application and in the above description of drawings and any modifications to them are intended to cover non-exclusive inclusion. The terms "first" and "second" and the like in this specification and claims of the application and in the above description of drawings are used to distinguish different objects, not to describe a particular order or primary and secondary relationship.

References to "embodiments" in this application mean that specific features, structures or characteristics described in conjunction with embodiments may be included in at least one embodiment of this application. The occurrence of the phrase at various locations in the specification does not necessarily refer to the same embodiment nor is it a separate or alternative embodiment that is mutually exclusive with other embodiments.

In the description of this application, it should be noted that unless otherwise clearly defined and stated, the terms "install", "connect", "connect to" and "attach" should be understood in a broad sense, for example, it can be a fixed connection, it can be a detachable connection, or it can be connected as a whole; it can be connected directly, or indirectly through an intermediary, or it can be the internal connection of two components. For ordinary technicians in the art, the specific meaning of the above terms in this application can be understood according to the specific circumstances.

The term "and/or" in this application is only a description of the relationship between the associated objects, indicating that there can be three relationships, for example, A and/or B can mean that A exists alone, A and B exist at the same time, and B exists alone. In addition, the character "/" in this application generally indicates that the associated objects is an "or" relationship.

In embodiments of the present application, the same reference marks represent the same components, and for the sake of brevity, detailed descriptions of the same components are omitted in different embodiments. It should be understood that the dimensions such as the thickness, length and width of the various components in the embodiments of this application shown in the accompanying drawings, as well as the overall thickness, length and width of the integrated device, are only exemplary illustrations and shall not impose any restrictions on this application.

The term "multiple" in the present application refers to more than two (including two).

In the present application, the battery cell may include a lithium ion secondary battery cell, a lithium ion primary battery cell, a lithium sulfur battery cell, a sodium lithium ion battery cell, etc., which is not limited by embodiments of the present application. The battery cell may be cylindrical, flat, cuboid or in other shapes, which is not limited by embodiments of the present application. Battery cells are generally divided into three types according to the way of packaging, including: a cylindrical battery cell, a square battery cell and a soft package battery cell, which is not limited by embodiments of the present application.

The battery cell includes an electrode component and an electrolyte, and the electrode component includes a positive electrode plate, a negative electrode plate and an isolation element. The battery cell works mainly depending on the movement of lithium ions between the positive electrode and the negative electrode. The positive electrode plate includes a positive electrode current collector and a positive electrode active material layer, wherein the positive electrode active material layer is coated on the surface of the positive electrode current collector; the positive electrode current collector includes a positive electrode current collection part and a positive electrode tab protruding from the positive electrode current collection part, wherein the positive electrode current collection part is coated with the positive electrode active material layer, and at least part of the positive electrode tab is not coated with the positive electrode active material layer. The material of the positive electrode current collector can be aluminum, the positive electrode active material layer includes positive electrode active material, and the positive electrode active material can be lithium cobalt, lithium iron phosphate, ternary lithium or lithium manganate and so on. The negative electrode plate includes a negative electrode current collector and a negative electrode active material layer, and the negative electrode active material layer is coated on the surface of the negative electrode current collector. The negative electrode current collector includes a negative electrode current collection part and a negative electrode tab protruding from the negative electrode current collection part. The negative electrode current collection part is coated with the negative electrode active material layer, and at least part of the negative electrode tab is not coated with the negative electrode active material layer. The material of the negative electrode current collector can be copper, the negative electrode active material layer includes negative electrode active material, and the negative electrode active material can be carbon or silicon and so on. In order to ensure that the fuse does not occur when a large current passes through, the number of the positive electrode tabs is multiple and the multiple positive electrode tables are stacked together, and the number of negative electrode tabs is multiple and the multiple negative electrode tabs are stacked together. The material of the isolation element can be polypropylene (PP) or polyethylene (PE), etc. In addition, the electrode component may have a winding structure or a laminated structure, which is not limited to by embodiments of the present application.

The inventors found that in the production process of the battery cell, it is necessary to go through a battery formation process, that is, the active substances on the electrode component are activated by chemical and electrochemical reactions to convert them into positive and negative electrodes with electrochemical characteristics. During the formation process, the solvent in the electrolyte is decomposed, and the decomposed solvent molecules react with electrons and lithium ions to form a passivation film, i.e., a Solid Electrolyte Interphase (SEI) film, on a surface of the negative electrode active material layer. Because some lithium ions participate in the formation of the SEI film, the lithium ions breaking away from the negative electrode to the positive electrode decreases, resulting in a decrease in the first week Coulomb efficiency of the battery cell, and the cycle performance and storage performance of the battery cell will also become worse. In order to improve the performance of the battery cell, it is considered to add a lithium source to the negative electrode plate so as to supplement lithium for the negative electrode plate, for example, by setting a lithium supplement layer on the surface of the negative electrode current collector having no negative electrode active material layer coated.

However, the inventors further found that when a lithium supplement layer is set on the surface of the negative electrode current collector having no negative electrode active material layer coated, the lithium in the lithium supplement layer will form lithium ion and embed into the negative electrode active material layer under the action of voltage difference, which may lead to over-embedding in a local area of the negative electrode active material layer and induce risks such as lithium precipitation, cyclic diving and battery cell short circuit.

Based on the above problems found by the inventors, the inventors improve the structure of the negative electrode plate of the battery cell, which includes the negative electrode current collector, the negative electrode active material layer and the lithium supplement layer. A first portion exceeds the positive electrode plate, a second portion is arranged corresponding to the positive electrode plate, and the lithium supplement layer is arranged on at least part of a surface of the first portion away from the negative electrode current collector. The lithium supplement layer can slowly release lithium ions in the cycle and storage process, and can reduce the lithium consumption in the positive electrode plate, thus improving the first Coulomb efficiency, cycle performance and storage performance of the battery cell.

The technical scheme described in embodiment of the present application is applicable to a battery and an electric device using a battery.

An electric device can be a vehicle, a mobile phone, a portable device, a laptop, a ship, a spacecraft, an electric toy, a power tool, and so on. A vehicle can be a fuel vehicle, a gas vehicle or a new energy vehicle, a new energy vehicle can be a pure electric vehicle, a hybrid vehicle or an add-on vehicle, etc. A spacecraft includes an aircraft, a rocket, a space shuttle, a spaceship, etc. An electric toy includes a fixed or mobile electric toy, e.g., a game console, an electric car toy, an electric ship toy, an electric aircraft toy and so on. A power tool includes a metal cutting power tool, a grinding power tool, an component power tool and a railway power tool, e.g., an electric drill, an electric grinder, an electric wrench, an electric screwdriver, a hammer, an impact drill, a concrete vibrator, an electric planer, and so on. The above electric devices are not limited by embodiments of the present application.

In order to facilitate illustration, the following embodiments take an electrical device being a vehicle as an example.

FIG. 1 is a structural schematic diagram of a vehicle provided by some embodiments of the present application. As shown in FIG. 1, the interior of the vehicle 1 is provided with a battery 2, which can be arranged at the bottom or head or tail of the vehicle 1. The battery 2 may be used for providing power supply of the vehicle 1, for example, the battery 2 can be used as the operating power supply of the vehicle 1.

The vehicle 1 may also include a controller 3 and a motor 4, and the controller 3 is used to control the battery 2 to power the motor 4, for example, for the working power demand of the vehicle 1 during startup, navigation and driving.

In some embodiments of the present application, the battery 2 can be used not only as the operating power source of the vehicle 1, but also as the driving power source of the vehicle 1, replacing or partly replacing fuel or natural gas to provide driving power for the vehicle 1.

Figure 2:
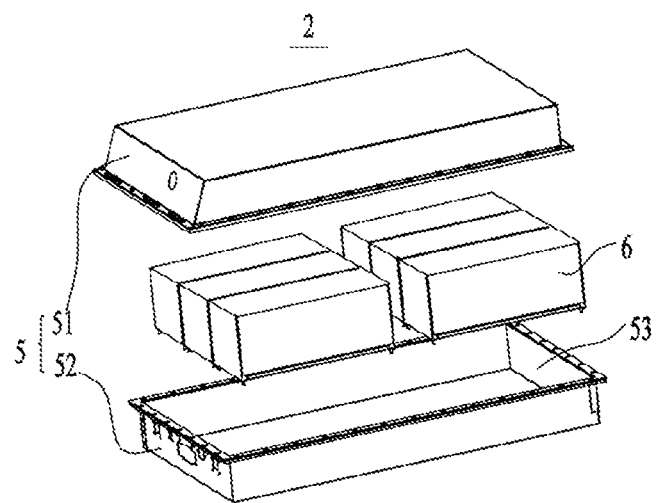
FIG. 2 is an explosive schematic diagram of a battery provided by some embodiments of the present application.

FIG. 2 is an explosive schematic diagram of a battery provided by some embodiments of the present application. As shown in FIG. 2, the battery 2 includes a box 5 and a battery cell (not shown in FIG. 2), and the battery cell is contained in the box 5.

The box 5 is used to hold the battery cell, and the box 5 can be of a variety of structures. In some embodiments, the box 5 may include a first box part 51 and a second box part 52, the first box part 51 and the second box part 52 are covered with each other, and the first box part 51 and the second box part 52 jointly define a holding space 53 for holding the battery cell. The second box part 52 may be a hollow structure with an opening at one end, the first box part 51 is a plate like structure, and the opening side of the first box part 51 covers the opening side of the second box parts 52 to form a box 5 with a holding space 53. The first box part 51 and the second box part 52 may both be hollow structures with an opening on one side, and the opening side of the first box part 51 covers the opening side of the second box part 52 to form a box 5 with a holding space 53. Of course, the first box part 51 and the second box part 52 may be of various shapes, such as cylinders, cuboids, and the like.

In order to improve the tightness after connection the first box part 51 with the second box part 52, a seal such as a sealant and a sealing ring may also be arranged between the first box part 51 and the second box part 52.

Assume that the first box part 51 covers the top of the second box part 52, the first box part 51 may also be referred to as an upper box cover, and the second box part 52 may also be referred to as a lower box body.

The battery 2 may have one battery cell or multiple battery cells. If there are multiple battery cells, the multiple battery cells can be connected in series or in parallel or in a hybrid connection, the hybrid connection means that there are both series and parallel connections among the multiple battery cells. The multiple battery cells can be directly connected in series or in parallel or in the hybrid connection, and then a whole composed of the multiple battery cells can be accommodated in the box 5. Of course, a battery module 6 can be formed by a plurality of battery cells connected in series or in parallel or in the hybrid connection, and a plurality of battery modules 6 can be connected in series or in parallel or in the hybrid connection to form a whole, and be accommodated in the box 5.

Figure 3:
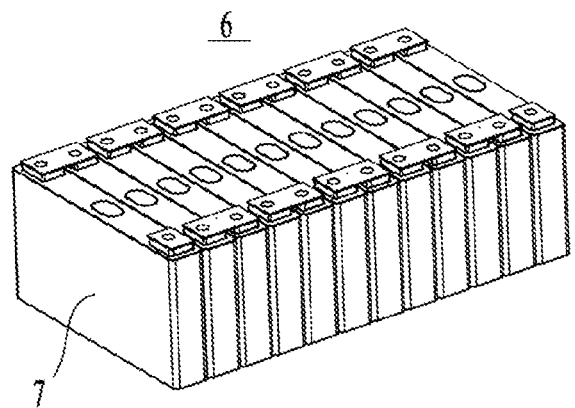
FIG. 3 is a structural schematic diagram of the battery module shown in FIG. 2.

FIG. 3 is a structural schematic diagram of the battery module shown in FIG. 2. As shown in FIG. 3, in some embodiments, there are multiple battery cells 7, and the multiple battery cells 7 is first connected in series or in parallel or in the hybrid connection to form a battery module 6. A plurality of battery modules 6 are then connected in series or in parallel or in the hybrid connection to form a whole and are accommodated in the box.

The multiple battery cells 7 in the battery module 6 can be electrically connected through a bus component to realize the parallel or series or hybrid connection of the multiple battery cells 7 in the battery module 6.

Figure 4:
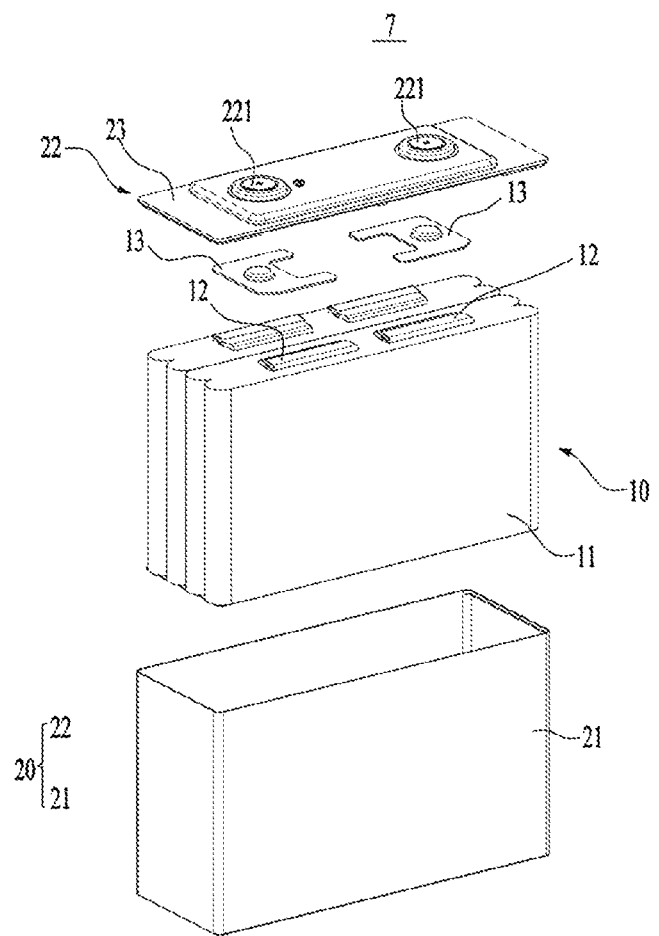
FIG. 4 is an explosive schematic diagram of a battery cell provided by some embodiments of the present application.
Figure 5:
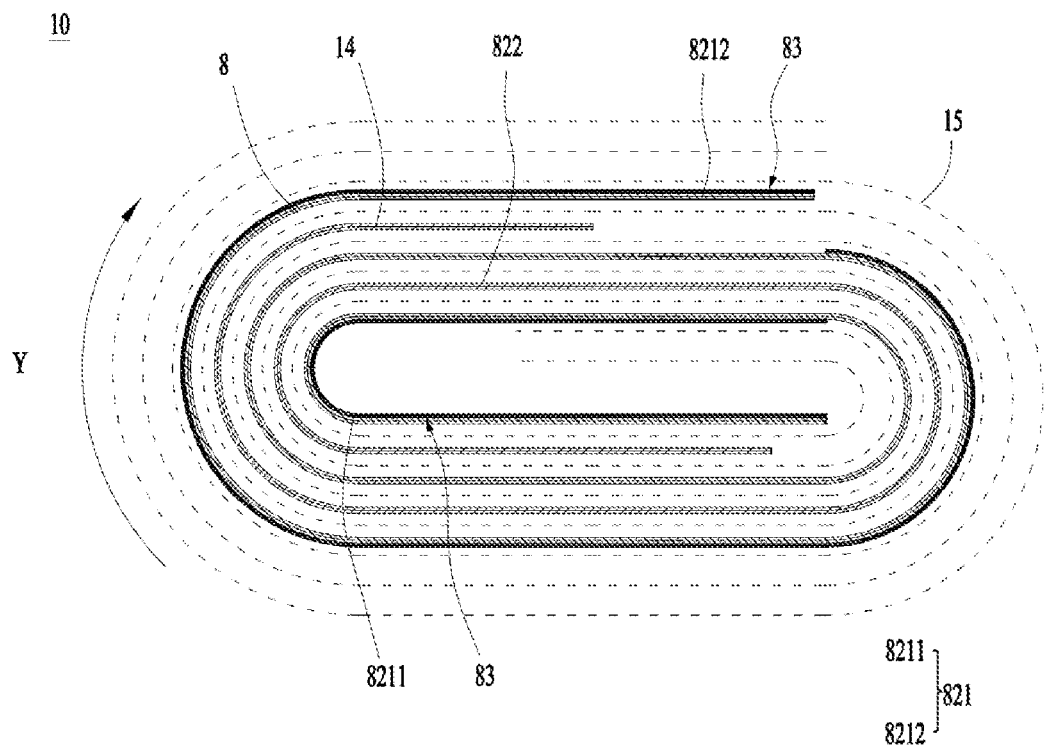
FIG. 5 is a structural schematic diagram of an electrode component of the battery cell provided by some embodiments of the present application.

FIG. 4 is an explosive schematic diagram of a battery cell provided by some embodiments of the present application. FIG. 5 is a structural schematic diagram of an electrode component of the battery cell provided by some embodiments of the present application.

As shown in FIGS. 4 and 5, the battery cell 7 provided by the embodiments of the present application includes an electrode component 10 and a housing component 20, and the electrode component 10 is accommodated in the housing component 20.

In some embodiments, the housing component 20 may also be used to accommodate electrolytes, such as electrolyte solution. The housing component 20 may be in a variety of structural forms.

In some embodiments, the housing component 20 may include a housing 21 and a cover component 22, wherein the housing 21 has a hollow structure with an opening on one side, and the cover component 22 covers the opening of the housing 21 and forms a sealed connection to form a holding cavity for accommodating the electrode component 10 and the electrolyte.

The housing 21 may be of a variety of shapes, e.g., cylinders, cuboids, etc. The shape of the housing 21 may be determined according to the specific shape of the electrode component 10. For example, if the electrode component 10 is of a cylindrical structure, a cylindrical housing may be selected; if the electrode component 10 is of a rectangular structure, a rectangular housing may be selected.

In some embodiments, the cover component 22 includes an end cover 23, which covers the opening of the housing 21. The end cover 23 may have a variety of structures, for example, the end cover 23 may have a plate-like structure, a hollow structure with an opening at one end, etc. As an example, in FIG. 4, the housing 21 has a rectangular structure, the end cover 23 has a plate-like structure, and the end cover 23 covers the opening at the top of the housing 21.

The end cover 23 may be made of an insulating material (e.g., a plastic) or a conductive material (e.g., a metal). When the end cover 23 is made of a metal material, the cover component 22 may also include an insulating member located on one side of the end cover 23 facing the electrode component 10 to insulate the end cover 23 from the electrode component 10.

In some embodiments, the cover component 22 may also include an electrode terminal 221 mounted on the end cover 23. There are two electrode terminals 221 which are defined as a positive electrode terminal and a negative electrode terminal, respectively. Both the positive electrode terminal and the negative electrode terminal are electrically connected to the electrode component 10 to output the electric energy generated by the electrode component 10.

In other embodiments, the housing component 20 may also be of other structures, for example, the housing component 20 includes a housing 21 and two cover components 22, the housing 21 is a hollow structure with opposite openings on both sides, and each cover component 22 correspondingly covers an opening of the housing 21 and forms a sealed connection to form a holding cavity for accommodating the electrode component 10 and the electrolyte. In this structure, one cover component 22 is provided with two electrode terminals 221 while the other cover component 22 is not provided with the electrode terminal 221, or one electrode terminal 221 may be provided on each of the two cover components 22.

In the battery cell 7, there may be one or more electrode components 10 contained in the housing component 20. As an example, in FIG. 4, there are 4 electrode components 10.

In some embodiments, the electrode component 10 includes a positive electrode plate, a negative electrode plate, and an isolation element. The electrode component 10 may be a wound electrode component, a laminated electrode component or other forms of electrode component.

In some embodiments, the electrode component 10 is a wound electrode component. The positive electrode plate 14, the negative electrode plate 8 and the isolation element 15 are all of ribbon structures. According to embodiments of the present application, the positive electrode plate 14, the spacer 15 and the negative electrode plate 8 are successively stacked and wound more than two times to form the electrode component 10. FIG. 5 shows a wound electrode component.

In other embodiments, the electrode component 10 is a laminated electrode component. Specifically, the electrode component 10 includes a plurality of positive electrode plates 14 and a plurality of negative electrode plates 8, and the positive plates 14 and the negative plates 8 are alternately stacked in a direction parallel to the thickness direction of the positive electrode plate 14 and the thickness direction of the negative electrode plate 8.

In view of the appearance of the electrode component 10, the electrode component 10 includes a main body portion 11 and an electrode tab portion 12 connected to the main body portion 11. As an example, the main body portion 11 extends out from one end of the main body portion 11 near the cover component 22.

In some embodiments, there are two electrode tab portions 12, and the two electrode tab portions 12 are defined as a positive electrode tab portion and a negative electrode tab portion, respectively. The positive electrode tab portion and the negative electrode tab portion may extend from the same end of the main body 11 or from the opposite ends of the main body 11, respectively.

The main body portion 11 is the core part of the electrode component 10 to realize the charge and discharge function, and the electrode tab portion 12 is used to draw out the current generated by the main body portion 11. The main body portion 11 includes a positive electrode current collector, a positive electrode active material layer, a negative current collector, a negative electrode active material layer and an isolation element. The positive electrode tab portion includes a plurality of positive electrode tabs, and the negative electrode tab portion includes a plurality of negative electrode tabs.

The electrode tab portion 12 is electrically connected to the electrode terminal 221. The electrode tab portion 12 can be directly connected to the electrode terminal 221 by welding or the like, or indirectly connected to the electrode terminal 221 by other components. For example, the electrode component 10 also includes a current collecting member 13 for electrically connecting the electrode terminal 221 and the electrode tab portion 12. The number of the current collecting member 13 is two, and the two current collecting members 13 are respectively defined as a positive electrode current collecting member and a negative electrode current collecting member, the positive electrode current collecting member is used for electrically connecting the positive electrode terminal and the positive electrode tab portion, and the negative electrode current collecting member is used for electrically connecting the negative electrode terminal and the negative electrode tab portion. When the battery cell is provided with a plurality of electrode components, the positive electrode current collecting members of the plurality of electrode components can be arranged as a whole, and the negative electrode current collecting members of the plurality of electrode components can be arranged as a whole.

Figure 6:
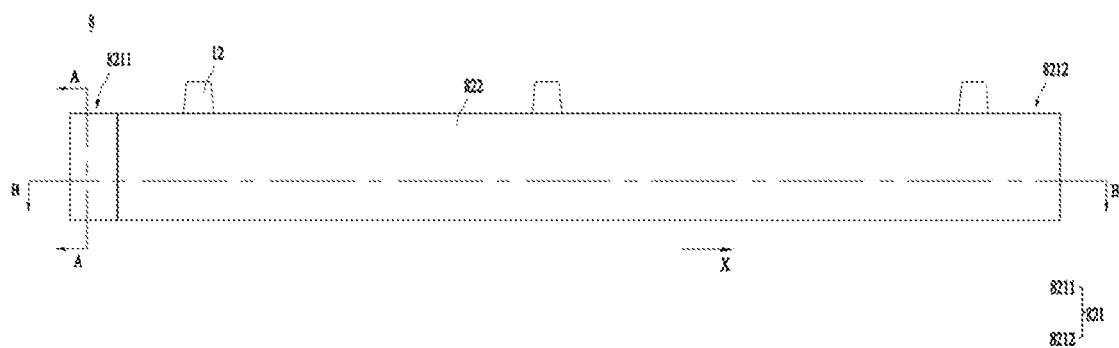
FIG. 6 is a structural schematic diagram of a negative electrode plate of the battery cell provided by some embodiments of the present application.
Figure 7:
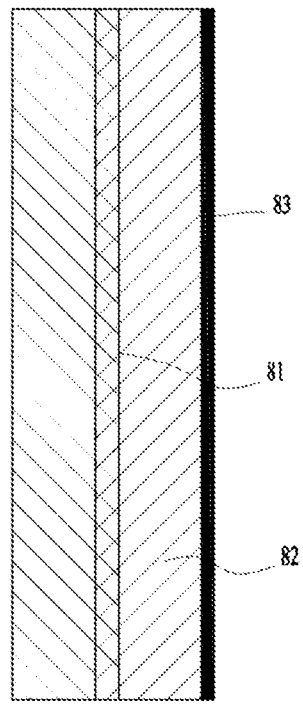
FIG. 7 is a sectional schematic diagram the negative electrode plate shown in FIG. 6 along a A-A line.
Figure 8:
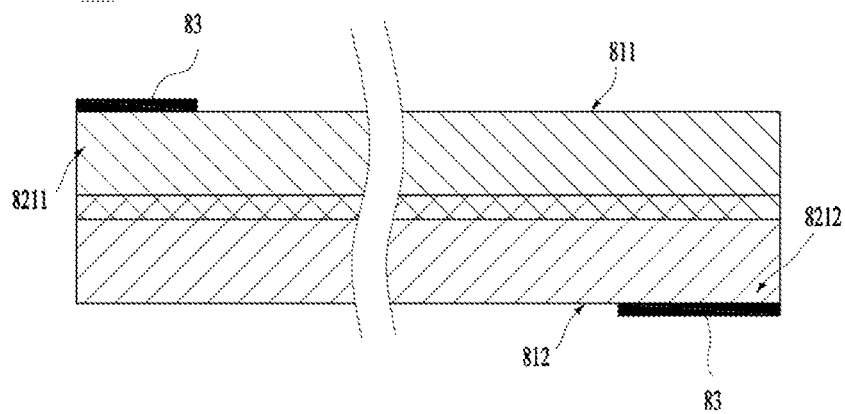
FIG. 8 is a sectional schematic diagram of the negative electrode plate shown in FIG. 6 along a B-B line.

FIG. 6 is a structural schematic diagram of a negative electrode plate of the battery cell provided by some embodiments of the present application. FIG. 7 is a sectional schematic diagram the negative electrode plate shown in FIG. 6 along an A-A line. FIG. 8 is a sectional schematic diagram of the negative electrode plate shown in FIG. 6 along a B-B line.

As shown in FIGS. 5 to 8, the battery cell provided by embodiments of the present application includes a positive electrode plate and a negative electrode plate. The negative electrode plate 8 includes a negative electrode current collector 81, a negative electrode active material layer 82 and a lithium supplement layer 83. The negative electrode active material layer 82 is arranged on at least one surface of the negative electrode current collector 81, and the negative electrode active material layer 82 includes a first portion 821 and a second portion 822 connected with the first portion 821, the first portion 821 exceeds the positive electrode plate, and the second portion 822 is arranged corresponding to the positive electrode plate. The lithium supplement layer 83 is arranged on at least part of a surface of the first portion 821 away from the negative electrode current collector 81.

The negative electrode current collector 81 has two surfaces opposite to each other in the direction of its own thickness, and the negative electrode active material layer 82 may be arranged on either or both of the two opposite surfaces of the negative electrode current collector 81. As an example, the two surfaces include a first surface 811 and a second surface 812.

The negative electrode current collector 81 plays the role of carrying active material, and can collect and lead the electrons produced by electrochemical reactions to an external circuit, thus converting chemical energy into electric energy.

In some embodiments, the negative electrode current collector 81 may be a metal foil or composite current collector. As an example, the metal foil can be a copper foil. The composite current collector may include a polymer material substrate and a metal layer formed on at least one surface of the polymer material substrate. The composite current collector can be formed by forming metal materials (e.g., copper, copper alloy, nickel alloy, titanium, titanium alloy, silver and silver alloy, etc.) on the polymer material substrate, e.g., polypropylene (PP), polyethylene terephthalate (PET), poly butylene terephthalate (PBT), polystyrene (PS), polyethylene (PE), etc.

In the charge and discharge process of the battery cell, lithium ions are repeatedly embedded and detached in the negative electrode active material layer 82, which results in electrochemical oxidation/reduction reactions, thus realizing the conversion between chemical energy and electric energy.

The negative electrode active material layer 82 includes the first portion 821 and the second portion 822. The first portion 821 and the second portion 822 are formed by coating a whole layer of negative electrode active material on the negative electrode current collector 81, and the second portion 822 is arranged corresponding to the positive electrode plate, the lithium detached from the positive electrode plate can be embedded in the second portion 822, and the lithium detached from the second portion 822 can be embedded in the positive electrode plate, thus, the second portion 822 can be used as a reaction zone to participate in the electrochemical reaction. The first portion 821 exceeds the positive electrode plate and is not set corresponding to the positive electrode plate, so the first portion 821 can be used as a non-reaction zone.

In some embodiments, the negative electrode active material layer 82 may adopt the negative electrode active material known in the art which can be used in the battery cell. As an example, the negative electrode active material may include at least one of: artificial graphite, natural graphite, soft carbon, hard carbon, silicon-based material, tin-based material, lithium titanate, etc. The silicon-based material may be selected from at least one of elemental silicon, silicon oxide compound, silicon-carbon composite, silicon-nitrogen complex and silicon alloy. The tin-based material can be selected from at least one of elemental tin, tin oxide and tin alloy. However, the present application is not limited to these materials, and other traditional materials that can be used as battery negative electrode active materials can also be adopted. These negative electrode active materials can be used alone, or more than two of them can be combined for use.

The lithium supplement layer 83 contains metal lithium for supplying lithium to the negative electrode active material layer 82. The lithium supplement layer 83 is arranged on at least part of the surface of the first portion 821 away from the negative electrode current collector 81. Since the standard electrode potential of lithium relative to hydrogen is less than that of the first portion 821 to hydrogen, there is a voltage difference between the lithium supplement layer 83 and the first portion 821. Since the lithium supplement layer 83 is arranged on the surface of the first portion 821 and fit closely with the first portion 821, after the battery cell is injected with the electrolyte, under the action of voltage difference, the lithium in the lithium supplement layer 83 will lose electrons and become free-moving lithium ions which will be embedded in the first portion 821 to form a lithium intercalation compound (a compound including lithium), at this time, a stable lithium supplement source is formed by the combination of the lithium supplement layer 83 and the lithium intercalation compound. In this case, the lithium supplement layer 83 is equivalent to the negative electrode, the first portion 821 is equivalent to the positive electrode, and an electrical circuit is formed between the lithium supplement layer 83 and the first portion 821, thus equivalent to a short circuit state. In the above process, the potential of the lithium supplement layer 83 decreases, thereby preventing the lithium-ions of the second portion 822 from diffusing and embedding into the first portion 821, and the lithium can be diffused and embedded into the second portion 822 at a slow speed, thus improving the first Coulomb efficiency, cycle performance and storage performance of the battery cell.

As examples, the negative electrode active material layer 82 is arranged on one surface of the negative electrode current collector 81, in which case the negative electrode active material layer 82 has only one layer, the lithium supplement layer 83 may be arranged on all the surface of the first portion of the active electrode material layer, or arranged on only part of the surface of the first portion of the active electrode material layer.

As other examples, a negative electrode active material layer 82 is arranged on both surfaces of the negative electrode current collector 81, in which case the negative active material layer 82 has two layers, and the lithium supplement layer 83 may be arranged on one of the active material layers, the specific arrangement is as shown in the previous examples, which will not be repeated herein. The lithium supplement layer 83 can also be arranged on the two active material layers, and the arrangement positions of the lithium supplement layer 83 on the two active material layers can be set independently, and the arrangement of each active material layer is as shown in the previous examples, which will not be repeated herein.

In the battery cell according to embodiments of the present application, the lithium supplement layer 83 is arranged on the first portion 821, and the standard electrode potential of lithium relative to hydrogen in the lithium supplement layer 83 is less than the standard electrode potential of the first portion 821 relative to hydrogen, and there is a voltage difference between the lithium supplement layer 83 and the first portion 821. After the battery cell is injected with the electrolyte, an electrical circuit is formed between the lithium supplement layer 83 and the first portion 821 due to the contact between the lithium supplement layer 83 and the first portion 821, which is equivalent to a short circuit state, the lithium in the lithium supplement layer 83 will lose electrons and become free-moving lithium ions which will be embedded in the first portion 821, and then the lithium will be diffused and embedded to the second portion 822 at a slow speed. Further, since the potential of the lithium supplement layer 83 decreases, the lithium ions of the second portion 822 can be prevented from being diffused and embedded into the first portion 821, thereby improving the first Coulomb efficiency, cycle performance and storage performance of the battery cell.

$V_{Li}$ is the potential of the lithium supplement layer 83, and $V_{negative}$ is the lithium intercalation platform voltage of the first portion 821. If $V_{Li}$ is greater than $V_{negative}$, that is, the potential of the lithium supplement layer 83 is higher than the lithium intercalation platform voltage of the first portion 821, at this time, the lithium in the lithium supplement layer 83 cannot be embedded into the first portion 821, and the lithium in the first portion 821 tends to diffuse toward the lithium supplement layer 83.

In order to ensure that the lithium in the lithium supplement layer 83 diffuses stably to the first portion 821, in some embodiments, the theoretical capacity of the lithium supplement layer 83 is $C_{Li}$, and the theoretical capacity of the part of the first portion 821 corresponding to the lithium supplement layer 83 is $C_1$, and $C_{Li}$ and $C_1$ satisfy the following relationship: $20\% \ C_1 \leq C_{Li} \leq 120\% \ C_1$. Herein, the theoretical capacity is the gram capacity of the corresponding material multiplied by the weight of the material used, and the gram capacity of lithium metal is known in the art as 3860 mAh/g. The gram capacity of the first portion 821 can adopt assemble button type semi-electric, the theoretical gram capacity is measured by blue electricity tester, and the theoretical capacity $C_1$ can be obtained by the theoretical gram capacity times the weight of the first negative electrode active material per unit area times the area of the corresponding lithium supplement layer.

When $20\% \ C_1 \leq C_{Li} \leq 120\% \ C_1$, $V_{Li}$ is less than $V_{negative}$, that is, the potential of the lithium supplement layer 83 is lower than the lithium intercalation platform voltage of the first portion 821. In this case, the lithium in the lithium supplement layer 83 can be stably embedded into the first portion 821, and the migration capacity of the lithium in the lithium supplement layer 83 migrating to the first portion 821 matches the capacity Attenuation of lithium in the negative electrode active material layer 82, which reduces the risk of lithium deposition and lithium precipitation on the negative electrode active material layer 82, thus improving the effect of lithium supplement and ensure the safety performance of the battery. Optionally, the lithium supplement effect can be further improved when $90\% \ C_1 \leq C_{Li} \leq 120\% \ C_1$.

In some embodiments, the negative electrode current collector 81 includes a first surface 811 and a second surface 812 opposite to each other, and the negative electrode active material layer 82 is arranged on both the first surface 811 and the second surface 812, wherein at least part of the first portion 821 of at least one of the two negative active material layers is provided with the lithium supplement layer 83. The lithium supplement layer 83 has a relatively large number of setting sites, and the lithium supplement layer 83 can be flexibly set according to the process requirements.

It is understood that a lithium supplement layer 83 can be arranged on the surface of the first portion 821 of one of the two negative electrode active material layers 82; or a lithium supplement layer 83 can be arranged on the surface of each of the first portion 821 of the two negative electrode active material layers 82, where at least part of the first portion 821 refers to the whole surface of the first portion 821, or part of the surface of the first portion 821.

Optionally, at least part of each of the first portions of the two negative electrode active material layers 82 is provided with the lithium supplement layer 83, which can further improve the lithium supplement effect by supplying lithium to the two negative electrode active material layers 82 respectively.

As some examples, in a direction from the first portion 821 to the second portion 822, the first portion 821 includes a first sub-portion 8211 and a second sub-portion 8212 opposite to each other, and the second portion 822 connects the first sub-portion 8211 and the second sub-portion 8212. The first sub-portion 8211 of one of the two negative electrode active material layers 82 is provided with the lithium supplement layer 83, and the second sub-portion 8212 of the other of the two negative electrode active material layers 82 is provided with the lithium supplement layer 83. The lithium can be supplemented pertinently by supplementing the lithium at different positions of the two negative active electrode material layers 82 in consideration of the structure of the electrode component, especially a winding electrode component. The X direction shown in FIG. 6 indicates the direction from the first portion 821 to the second portion 822.

Taking the winding electrode component as an example, the positive electrode plate, the isolation element and the negative electrode plate 8 are wound to form a winding structure. After winding, the first sub-portion 8211 and the second sub-portion 8212 are opposite to each other in the winding direction Y, the first sub-portion 8211 is arranged close to the winding axis, and the first sub-portion 8211 is located on the side of the negative electrode current collector away from the positive electrode plate and inside the winding structure. The second sub-portion 8212 is arranged away from the winding axis, and the second sub-portion 8212 is located on the side of the negative electrode current collector away from the positive electrode plate and outside the winding structure. During winding, the negative electrode plate 8 may be wound more than one empty circle, and the corresponding part of the first sub-portion 8211 can be used as an empty winding area; and at the end, the negative electrode plate 8 can be wound more than one circle relative to the positive electrode plate, and the corresponding part of the second sub-portion 8212 can be used as the ending area, so that the negative electrode plate 8 covers the positive electrode plate. FIG. 5 illustrates a structural schematic diagram of the wound electrode component.

specifically, the theoretical capacity of the lithium supplement layer 83 arranged corresponding to the first sub-portion 8211 is $C_A$, and the theoretical capacity of the lithium supplement layer 83 arranged corresponding to the second sub-portion 8212 is $C_B$, wherein $C_A > C_B$. There is an electrolyte inside the wound electrode component, and the position of the first sub-portion 8211 is more favorable for the diffusion of lithium ions than that of the second sub-portion 8212. Therefore, $C_A > C_B$ can guarantee the migration capacity of the first sub-portion 8211 with respect to the lithium of the negative electrode active material layer 82.

Of course, the negative electrode plate 8 can also be compounded with the positive electrode plate and the isolation element to form a laminated structure. The first sub-portion 8211 and the second sub-portion 8212 may be opposite to each other along the length direction of the laminated structure or, of course, along the width direction of the laminated structure.

The negative electrode plate 8 may include two negative electrode active material layers 82, each of which includes the first sub-portion 8211 and the second sub-portion 8212 opposite to each other along the winding direction Y, the first sub-portion 8211 is arranged close to the winding axis, the second sub-portion 8212 is arranged away from the winding axis, and the first sub-portion 8211 of one of the two negative electrode active material layers 82 is provided with the lithium supplement layer 83, and the second sub-portion 8212 of the other layer is provided with the lithium supplement layer 83.

In some embodiments, the lithium supplement layer 83 includes a metal lithium layer or a lithium alloy layer.

The metal lithium of the metal lithium layer has relatively high gram capacity and purity, so it is not easy to produce by-products, thus reducing the adverse effect on the battery cell. As an example, the metal lithium layer includes a lithium foil layer or a lithium powder layer, the lithium foil layer may be selected, and the lithium foil layer is more easily processed and formed on the negative electrode active material layer 82.

The lithium alloy layer can not only supplement the lithium source to the negative electrode active material layer 82, but also enhance the strength of the negative electrode plate 8 through other metals in the lithium alloy layer. As an example, the lithium alloy layer includes an aluminum-lithium alloy layer, a magnesium-lithium alloy layer or a tin-lithium alloy layer.

In some embodiments, the negative electrode active material layer 82 includes a negative electrode active material, which includes one or more of artificial graphite, natural graphite and silicon-based materials.

The standard electrode potential of lithium relative to hydrogen in the lithium supplement layer 83 is about −3.05V, and the standard electrode potential of artificial graphite without lithium intercalation, the negative electrode active material (artificial graphite, natural graphite or silicon-based material) without lithium intercalation relative to hydrogen is about 0V. There is a voltage difference of about 3V between lithium and the above negative electrode active materials without lithium intercalation. After the lithium in the lithium supplement layer 83 loses electrons and forms lithium ions, the lithium ions embed into the first portion 821 and form $LiC_x$ (x≥6) and/or $Li_xSi_y$ (x>0, y>0) with the negative electrode active material. In this case, the lithium supplement layer 83, $LiC_x$ and/or $Li_xSi_y$ are combined to form a stable lithium supplement source, and then lithium will be diffused and embedded into the second portion 822 at a slow speed. Due to the decrease of the potential of the lithium supplement layer 83, the lithium ions of the second portion 822 can be effectively prevented from being diffused and embedded into the lithium ion of the first portion 821, thus the performance of the battery cell can be improved.

In some embodiments, the negative electrode active material layer 82 also optionally includes a binder. The binder can be selected from at least one of styrene-butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative electrode active material layer 82 my further optionally include a conductive agent. The conductive agent can be selected from at least one of superconducting carbon, acetylene black, carbon black, Keqin black, carbon dot, carbon nanotube, graphene and carbon nanofiber.

In some embodiments, the negative electrode active material layer 82 may optionally include other auxiliaries, for example, thickeners such as sodium carboxymethyl cellulose (CMC-Na), etc.

EMBODIMENTS

Embodiments of the present application are described below. The embodiments described below are exemplary and are used only to interpret this application and cannot be understood as a limitation to this application. If the specific technology or condition is not specified in the embodiments, it shall be carried out in accordance with the technology or condition described in the literature in the field or in accordance with the product specification. If the reagents or instruments used are not indicated by manufacturers, they are all conventional products that can be purchased in the market.

Embodiment 1~Embodiment 10 and Comparison Example 1

1. Preparation of the Positive Electrode Plate

An aluminum foil with a thickness of 8 μm is used as the positive electrode current collector.

The positive electrode active materials of Lithium iron phosphate, conductive agent acetylene black and binder polyvinylidene fluoride (PVDF) were fully stirred and mixed in appropriate amount of N-methylpyrrolidone (NMP) solvent according to the weight ratio of 96:2:2 to form a uniform positive electrode slurry. The positive electrode slurry was coated on the surface of the positive electrode current collector, and the positive electrode plate was obtained after drying and other processes.

2. Preparation of the Negative Electrode Plate

An aluminum foil with a thickness of 8 μm is used as the positive electrode current collector.

The negative electrode active materials of artificial graphite, conductive carbon black, thickener sodium carboxymethyl cellulose CMC and binder styrene-butadiene rubber emulsion SBR were mixed according to the weight ratio of 96.5:1.0:1.0:1.5, and the solvent of deionized water was added, stirring them under the action of a vacuum mixer until the system was homogeneous, and the negative electrode slurry was obtained. The negative electrode slurry is uniformly coated on the negative electrode current collector of copper foil to form a negative electrode active material layer, and a layer of lithium foil is applied to the first portion and/or the second portion of the negative electrode active material layer as a lithium supplement layer to obtain the negative electrode plate. The specific setting position of the lithium foil is shown in Table 1.

Preparation of Electrolyte

Ethylene carbonate (EC), methyl ethyl carbonate (EMC) and diethyl carbonate (DEC) were mixed according to the volume ratio at 1:1:1 to obtain an organic solvent, and then fully dried lithium salt LiPF6 was dissolved in the mixed organic solvent to prepare an electrolyte with a concentration of 1 mol/L.

4. Preparation of the Lithium-Ion Battery

The positive electrode plate, the isolation film (PP/PE/PP composite film) and the negative electrode plate are stacked in turn, then wound into a core and placed into a package housing, and the electrolyte is injected into the core, and then the lithium ion battery is obtained by sealing, static, hot and cold pressing, formation and other processes.

TABLE 1

| | First portion | | the theoretical capacity of the lithium supplement layer $C_{Li}$ | the theoretical capacity of the part of the first portion arranged corresponding to the lithium supplement layer $C_1$ | the theoretical capacity of the lithium supplement layer on the first sub-portion $C_A$ | the theoretical capacity of the lithium supplement layer on the second sub-portion $C_B$ | $C_{Li}/C_1$ | $C_A/C_B$ |
|---|---|---|---|---|---|---|---|---|
| | First sub-portion (located on the first surface) | Second sub-portion (located on the second surface) | | | | | | |
| Embodiment 1 | With the lithium supplement layer | With the lithium supplement layer | 206 mA | 229 mA | 103 mA | 103 mA | 0.9 | 1 |
| Embodiment 2 | With the lithium supplement layer | none | 206 mA | 229 mA | 206 mA | 0 | 0.9 | / |
| Embodiment 3 | none | With the lithium supplement layer | 206 mA | 229 mA | 0 | 206 mA | 0.9 | / |
| Embodiment 4 | With the lithium supplement layer | With the lithium supplement layer | 206 mA | 1030 mA | 103 mA | 103 mA | 0.2 | 1 |
| Embodiment 5 | With the lithium supplement layer | With the lithium supplement layer | 206 mA | 206 mA | 103 mA | 103 mA | 1 | 1 |
| Embodiment 6 | With the lithium supplement layer | With the lithium supplement layer | 206 mA | 172 mA | 103 mA | 103 mA | 1.2 | 1 |
| Embodiment 7 | With the lithium supplement layer | With the lithium supplement layer | 206 mA | 2060 mA | 103 mA | 103 mA | 0.1 | 1 |
| Embodiment 8 | With the lithium supplement layer | With the lithium supplement layer | 206 mA | 138 mA | 103 mA | 103 mA | 1.5 | 1 |
| Embodiment 9 | With the lithium supplement layer | With the lithium supplement layer | 206 mA | 229 mA | 124 mA | 82 mA | 0.9 | 1.5 |
| Embodiment 10 | With the lithium supplement layer | With the lithium supplement layer | 206 mA | 229 mA | 68 mA | 138 mA | 0.9 | 0.49 |
| Comparison example 1 | none | none | / | / | / | / | / | / |

Performance Test

Test Section

1. Storage Performance Test of Lithium-Ion Battery

At 45° C., the lithium-ion batteries prepared by the embodiments and the comparison example are stored under 100% SOC, and the data is collected every 15 days in the first 60 days and every 30 days after 60 days until the capacity attenuates to 80%, and on the 30th, 60th and 180th day of storage, a lithium-ion battery was disassembled to analyze and test the lithium supplement layer. A plurality of lithium-ion batteries are prepared in each of the embodiments and the comparison example.

2. Cycle Performance Test of Lithium-Ion Battery

At 45° C., the lithium-ion batteries prepared by the embodiments and the comparison example are charged at 1C rate and discharged at 1C rate, and a full discharge cycle test is carried out until the capacity of the lithium-ion battery attenuates to 80% of the initial capacity, and the number of cycles is recorded, and a lithium-ion battery is disassembled to carry out element analysis and test of the lithium supplement layer at the 100th, 300th, 600th cycles.

3. Element Analysis of Lithium Supplement Layer in Lithium-Ion Battery.

The negative electrode is flushed into a wafer with a diameter of 14 mm, the total weight of 6-8 wafers is weighed, and the total weight of the negative electrode active material layer is obtained by subtracting the weight of the negative electrode current collector, then the lithium content in the tested electrode is measured by the test method of elemental analysis heating plate digestion.

4. Test of Elemental Analysis and Acid Digestion

The device of Nanjing Reynick GS-I is adopted, the negative electrode plate was placed on the device and digested at 180° C. to get the original solution, then volume was determined, and then quantitative analysis was carried out on the ICP-OES instrument to get the content of lithium.

Test Results

The test results are shown in Table 2.

TABLE 2

|  | First Coulomb Efficiency | Capacity retention rate stored at 45° C. for 180 days | Capacity retention rate of 1000 cycles at 45° C. |
|---|---|---|---|
| Embodiment 1 | 91.30% | 94.80% | 85.90% |
| Embodiment 2 | 91.00% | 94.00% | 85.10% |
| Embodiment 3 | 90.70% | 93.50% | 84.70% |
| Embodiment 4 | 90.50% | 93.10% | 83.90% |
| Embodiment 5 | 91.40% | 94.80% | 86.01% |
| Embodiment 6 | 91.60% | 95.01% | 85.97% |
| Embodiment 7 | 90.30% | 92.40% | 83.14% |
| Embodiment 8 | 91.70% | 95.05% | 78.35% |
| Embodiment 9 | 91.30% | 94.90% | 86.50% |
| Embodiment 10 | 91.20% | 94.20% | 85.70% |
| Comparison example 1 | 90.20% | 92.40% | 83.10% |

As can be seen from the data in Table 2, compared to the comparison example 1, the embodiments of this application provide a lithium supplement layer on the first sub-portion and/or the second sub-portion of the negative electrode active material layer, the storage performance and cycle performance of the lithium-ion battery can be significantly improved.

From embodiment 3 to embodiment 8, it can be seen that $C_{Li}$ and $C_1$ satisfy the following relationship: 20% $C_1 \leq C_{Li} \leq 120\% C_1$; in particular, 90% $C_1 \leq C_{Li} \leq 120\% C_1$ can significantly improve the storage performance and cycle performance of the lithium-ion battery.

Compared with embodiment 10, $C_A > C_B$ in embodiment 9 can significantly improve the storage performance and cycle performance of the lithium-ion battery.

Although the present application has been described with reference to preferred embodiments, various improvements can be made and components can be replaced with equivalents without departing from the scope of the present application, in particular, as long as there is no structural conflict, the technical features mentioned in the various embodiments can be combined in any way. This application is not limited to the specific embodiments disclosed herein, but includes all technical solutions that fall within the scope of the claims.

What is claimed is:

1. A battery cell, comprising:
a positive electrode plate; and
a negative electrode plate,
wherein the positive electrode plate and the negative electrode plate are stacked and wound about a winding axis, the negative electrode plate comprises a negative electrode current collector, a negative electrode active material layer arranged on at least one surface of the negative electrode current collector, and a lithium supplement layer, wherein the negative electrode active material layer comprises a first portion and a second portion connected with the first portion, the first portion exceeds the positive electrode plate, the second portion is arranged corresponding to the positive electrode plate, and the lithium supplement layer is arranged on at least a part of a surface of the first portion away from the negative electrode current collector;
the negative electrode current collector comprises a first surface and a second surface opposite to each other, and the negative electrode plate comprises two negative electrode active material layers respectively arranged on the first surface and the second surface,
in a direction from the first portion to the second portion, the first portion comprises a first sub-portion and a second sub-portion opposite to each other, the first sub-portion is arranged close to the winding axis and exceeds the positive electrode plate by more than one winding circle, the second sub-portion is arranged away from the winding axis and exceeds the positive electrode plate by more than one winding circle, and the second portion connects the first sub-portion and the second sub-portion;
the first sub-portion of one of the two negative electrode active material layers is provided with the lithium supplement layer on an entire surface of the first sub-portion, and the second sub-portion of the other of the two negative electrode active material layers is provided with the lithium supplement layer;
a theoretical capacity of the lithium supplement layer provided corresponding to the first sub-portion is $C_A$;
a theoretical capacity of the lithium supplement layer provided corresponding to the second sub-portion is $C_B$; and,
wherein $C_A > C_B$.

2. The battery cell of claim 1, wherein a theoretical capacity of the lithium supplement layer is $C_{Li}$, a theoretical capacity of a part of the first portion arranged corresponding to the lithium supplement layer is $C_1$, and $C_{Li}$ and $C_1$ satisfy the following relationship: 20% $C_1 \leq C_{Li} \leq 120\% C_1$.

3. The battery cell of claim 1, wherein
the lithium supplement layer comprises a metal lithium layer or a lithium alloy layer.

4. The battery cell of claim 1, wherein
the negative electrode active material layer comprises a negative electrode active material, which comprises one or more of artificial graphite, natural graphite and silicon-based materials.

5. The battery cell of claim 1, further comprising an isolation element arranged between the positive electrode plate and the negative electrode plate, and the positive electrode plate, the isolation element and the negative electrode plate are wound to form a winding structure,
the first portion is arranged near the winding axis, and the second portion is arranged away from the winding axis.

6. A battery comprising the battery cell of claim 1.

7. An electric device comprising the battery of claim 6 for providing electrical energy.

* * * * *